United States Patent [19]

Anderson et al.

[11] Patent Number: 5,647,043
[45] Date of Patent: Jul. 8, 1997

[54] UNIPARTITE JACK RECEPTACLE

[75] Inventors: Jerry Max Anderson, Austell; Ray R. Cammons, Woodstock; Elizabeth J. Driscoll, Atlanta; Norman Roger Lampert, Norcross, all of Ga.

[73] Assignee: Lucent Technologies, Inc., Murray Hill, N.J.

[21] Appl. No.: 545,042

[22] Filed: Oct. 12, 1995

[51] Int. Cl.$^6$ .................................. G02B 6/00; G02B 6/36
[52] U.S. Cl. ............................................................. 385/78
[58] Field of Search ................................. 385/55, 56, 60, 385/76, 77, 78, 81, 84, 85, 86, 87, 88, 89, 92, 139, 147

[56] References Cited

U.S. PATENT DOCUMENTS

| | | | |
|---|---|---|---|
| 4,611,887 | 9/1986 | Glover et al. | 385/88 |
| 4,687,291 | 8/1987 | Stape et al. | 350/96.22 |
| 5,096,439 | 3/1992 | Arnett | 439/536 |
| 5,123,071 | 6/1992 | Mulholland et al. | 385/33 |
| 5,274,729 | 12/1993 | King et al. | 385/134 |

FOREIGN PATENT DOCUMENTS

| | | |
|---|---|---|
| 0228063 | 7/1987 | European Pat. Off. . |
| 0462907 | 12/1991 | European Pat. Off. . |

OTHER PUBLICATIONS

Sugita, et al, "SC-Type Single-Mode Optical Fiber Connectors", Journal of Lightwave Technology, vol. 7, No. 11, pp. 1689–1696, Nov. 1989.

*Primary Examiner*—Akm E. Ullah
*Attorney, Agent, or Firm*—Michael A. Morra

[57] ABSTRACT

A one-piece (unipartite) jack receptacle 40 is molded from thermoplastic material into a generally rectangular shape to provide a compact structure for high-density optical terminations. The receptacle includes a pair of cavities 460, each having an opening in its front end, and each having an opening 422 in its back end for receiving a cylindrical alignment sleeve 440. A U-shaped opening extends from a top-side surface 415 of the receptacle into each cavity to form a cantilever 410, which may be used to hold the receptacle within a panel 200. Molded into the sidewalls of each cavity are retaining surfaces 432 for holding an optical connector within the cavity. The retaining surfaces are located directly beneath the U-shaped opening 463 to facilitate molding. Heretofore, comparable jack receptacles have been assembled from multiple parts; and this has become more costly and complex as the size of jack receptacles has decreased. In one application of the invention, a pair of the jack receptacles are joined together, back-to-back, to form an adapter 400.

9 Claims, 6 Drawing Sheets

UNIPARTITE JACK RECEPTACLE

CROSS REFERENCE TO RELATED APPLICATIONS

This invention is related U.S. Ser. No. 08/265,291 to J. M. Anderson et al. filed on Jul. 29, 1994 now U.S. Pat. No. 5,481,634.

1. Technical Field

This invention relates generally to a jack receptacle for receiving an optical fiber connector, and more particularly to an adapter which is suitable in high-density optical connecting arrangements.

2. Background of the Invention

The growth in optical communications is primarily attributable to the enormous bandwidth (information-carrying capacity) associated with an optical fiber. Today, many homes are connected to a telephone-service provider via copper wires for POTS (plain old telephone service), and to a video-service provider via coaxial cable for CATV (cable television) service. Whereas the combined bandwidth of these wires and cables is large, the bandwidth of a hair-thin optical fiber is at least an order of magnitude larger— particularly when WDM (wavelength division multiplexing) is employed. Most observers believe that all homes and businesses will be equipped with optical fiber in the future, not because there is a present need for its capabilities, but because excess capacity is desirable in itself. The mere existence of such excess capacity will stimulate services and capabilities that are unimportant today, but indispensable tomorrow.

Accommodating the expected growth in optical fiber communication systems requires that interconnection systems be designed that are compact and inexpensive. Indeed, a variety of connectors are known in the art, and they all are faced with the task of maintaining the ends of two optical fiber ends such that the light-carrying region (core) of one fiber is axially aligned with the core of the other fiber; and consequently, all of the light from one fiber is coupled to the other fiber. This is a particularly challenging task because the core of an optical fiber is quite small. For example, a singlemode optical fiber has a core diameter of about 8 microns where 1 micron=1 μm=$10^{-3}$ millimeters (ram). An optical fiber connector typically includes a small cylinder with a glass or plastic fiber installed along its central axis. This cylinder is generally referred to as a ferrule. In a typical connection between two optical fibers, a pair of ferrules are butted together, end-to-end, and light travels across the interface. The loss encountered depends on axial alignment, the condition of the fiber end faces, and the refractive index of the interface gap.

Cooperating with the optical connectors are coupling devices (adapters) which comprise back-to-back receptacles for receiving the connectors and holding them in axial alignment. Typically, a number of adapters are mounted in a panel where interconnections are organized and periodically changed. Such panels are important because they provide access to individual optical fibers for testing and service rearrangement. And if the use of optical fiber in communication systems continues its explosive growth, then it will be advantageous to be able to mount a large number of adapters on each panel.

U.S. Pat. No. 5,123,071 to Mulholland et al. discloses, among other things, a panel-mounted adapter comprising six (6) separate parts. This adapter is used to optically interconnect a pair of SC connectors. A pair of receptacles are bonded together, back-to-back, each including an insert having a pair of resilient catch pieces that hold the SC connector. The insert snaps into a cavity within the receptacle, and its catch pieces expand into this cavity when the SC connector is inserted. The insert includes a central bore which is designed to receive an alignment sleeve. Because so many parts are needed in this adapter, and because space within the cavity is required to accommodate movement of the catch pieces, it is larger and more expensive than desirable.

U.S. Pat. No. 5,274,729 to King et al. discloses a number of buildout blocks and buildouts that engage each other using the same mating structure within an adapter that interconnects any combination of ST, SC, or FC connectors. The buildout blocks mount on a panel and by selecting the proper buildout, interconnection between any combination of the above-mentioned connectors is possible. And while such devices provide interchangeability among different kinds of optical connectors, they each require a number of individual parts that must be joined together before mounting on the panel. Additionally, the devices shown are not designed for use in high density applications.

Furthermore, the optical connectors shown in each of the above references will become obsolete as a new generation of smaller optical connectors is introduced. For example, the cylindrical ferrules disclosed in the above references have a diameter of about 2.5 mm, whereas the diameter of the new generation of ferrules is about 1.25 mm. Indeed, NTT International Corporation has recently introduce a new device known as the MU connector, which is best described as being a miniaturized version of the SC connector. A panel-mounted adapter has been designed to receive the MU connector which is relatively small, but still comprises six (6) separate parts. As optical connectors become smaller, the receptacles that receive them need to become proportionally smaller if the benefits of miniaturization are to be realized. More importantly, as the parts become smaller, the complexity of construction and the number of parts must be reduced. What is needed and, seemingly, what is unavailable in the prior art, is a jack receptacle which enables a large number of individual optical connectors to be mounted close together in a panel or the like. Desirably, this receptacle should be inexpensive to manufacture, easy to assemble, and convenient to install.

SUMMARY OF THE INVENTION

The foregoing problems of the prior art are overcome by the present invention which comprises a one-piece (unipartite) jack receptacle for an optical connector. The jack receptacle includes top and rear surfaces, and at least one generally rectangular cavity for receiving the optical connector. The cavity has a front end, a back end and four sidewalls. The front end of the cavity includes a generally rectangular opening for admitting the optical connector into the cavity. The back end of the of cavity includes a generally circular opening for enabling a ferrule within the optical connector to exit the cavity. At least one of the cavity sidewalls has a non-movable retaining surface for interlocking with a movable latching member on the optical connector.

In an illustrative embodiment of the invention The top surface of the receptacle includes a cantilever member whose free end is positioned toward the back end of the receptacle. A flange is also located at the back end of the receptacle, and it cooperates with the free end of the cantilever member to capture a panel edge therebetween when, for example, the receptacle is inserted into an aperture of a panel.

In the illustrative embodiment, the jack receptacle is molded from a thermoplastic material such as polycarbonate. Moreover, because there are no moving parts within the receptacle for holding the connector, the receptacle can be smaller and less expensive. Duplex and quadruplex receptacles are shown having two cavities and four cavities respectively. Cylindrical pins and holes on the back surface of each receptacle are positioned to allow a pair of identical receptacles to be joined together, back-to-back, to form an adapter using only three (3) parts. The pins have slightly larger diameters than the holes so that the receptacles can be press-fit together without the use of adhesives or other bonding techniques.

BRIEF DESCRIPTION OF THE DRAWINGS

The invention and its mode of operation will be more clearly understood from the following detailed description when read with the appended drawing in which.

DETAILED DESCRIPTION

Figure 1:
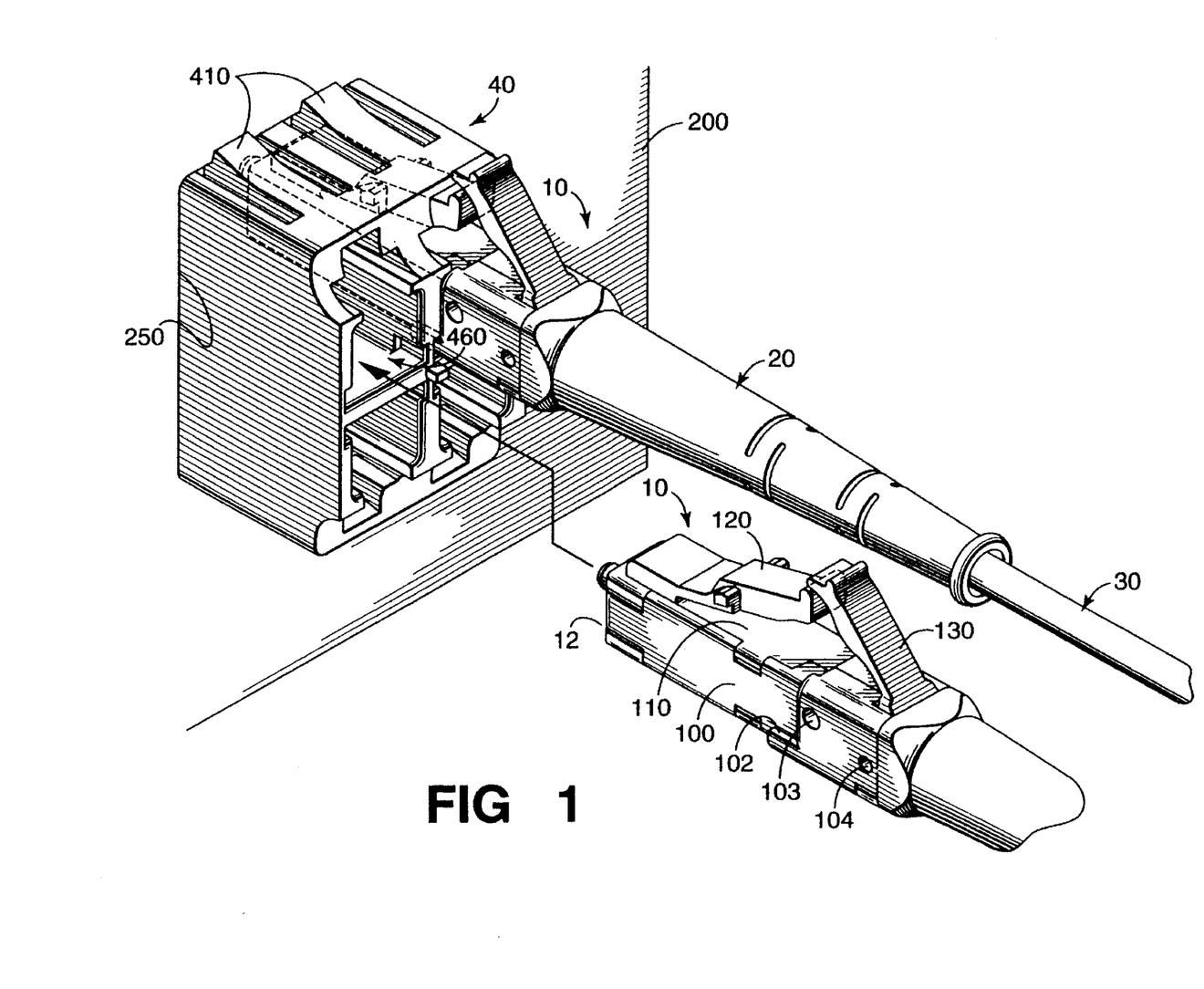
FIG. 1 is a perspective view of a quadruplex jack receptacle mounted in a panel and receiving a pair of optical connectors.

FIG. 1 is a perspective view of a quadruplex jack receptacle 40 mounted in a rectangular aperture 250 in panel 200 and held therein by panel-locking members 410 that are molded into the top and bottom surfaces of the receptacle. One optical connector 10 is shown installed in one of the four cavities 460 of the receptacle, while another identical optical connector 10 is about to be installed. Each optical connector 10 comprises a housing 110 and a cover 100 that enclose a fiber-holding structure. Complete details regarding the specific design of such connectors are disclosed in Application Ser. No. 08/520808 to Lampert et al. filed on Aug. 30, 1995. These optical connectors are designed to be joined together in several ways to form a duplex connector, a quadruplex connector, or an "n-plex" connector. Holes 103,104 assist in accomplishing this goal. Details regarding the specific design of a duplex connector, for example, are disclosed in Application Ser. No. 08/520809 to Lampert et al. which was also filed on Aug. 30, 1995.

Optical fiber connector 10, together with bend-limiting strain-relief boot 20, terminates an optical cable 30. Connector 10 includes a plug end 12 which is inserted into cavity 460 of jack receptacle 40. The outside surface of the connector 10 includes a latching tab 120 for securing the connector to the jack receptacle 40 in order to prevent unintended decoupling therebetween. Latching tab 120 is molded into the connector and includes a "living hinge" which allows it to be moved up and down in a direction that: is perpendicular to a central axis of the connector. Similarly, a trigger 130 is molded into the connector 10 and includes a living hinge which also allows it to be moved up and down in a direction which is perpendicular to the central axis of the connector. Latching tab 120 and trigger 130 are cantilever beams whose longitudinal axes reside in a plane that includes the central axis of the connector. The cantilever beams include fixed ends, and free ends that interact with each other. When trigger 130 is depressed, its free end engages the free end of latching tab 120 in order to release the connector 10 from the jack receptacle 40. Each illustrative optical connector 10 has a footprint (cross-section dimension) of only 4.6 by 4.6 mm, and a large number of such connectors can be grouped in a compact array.

Cover 100 inches a reinforcement key 102 which cooperates with a mating recess 461 (see FIG. 2) within the associated jack receptacle to keep the optical connector 10 from moving when vertical-side loading is applied to the connector. A symmetrically positioned reinforcement key (not shown) is molded into the side of housing 110 for the same purpose.

Figure 2:
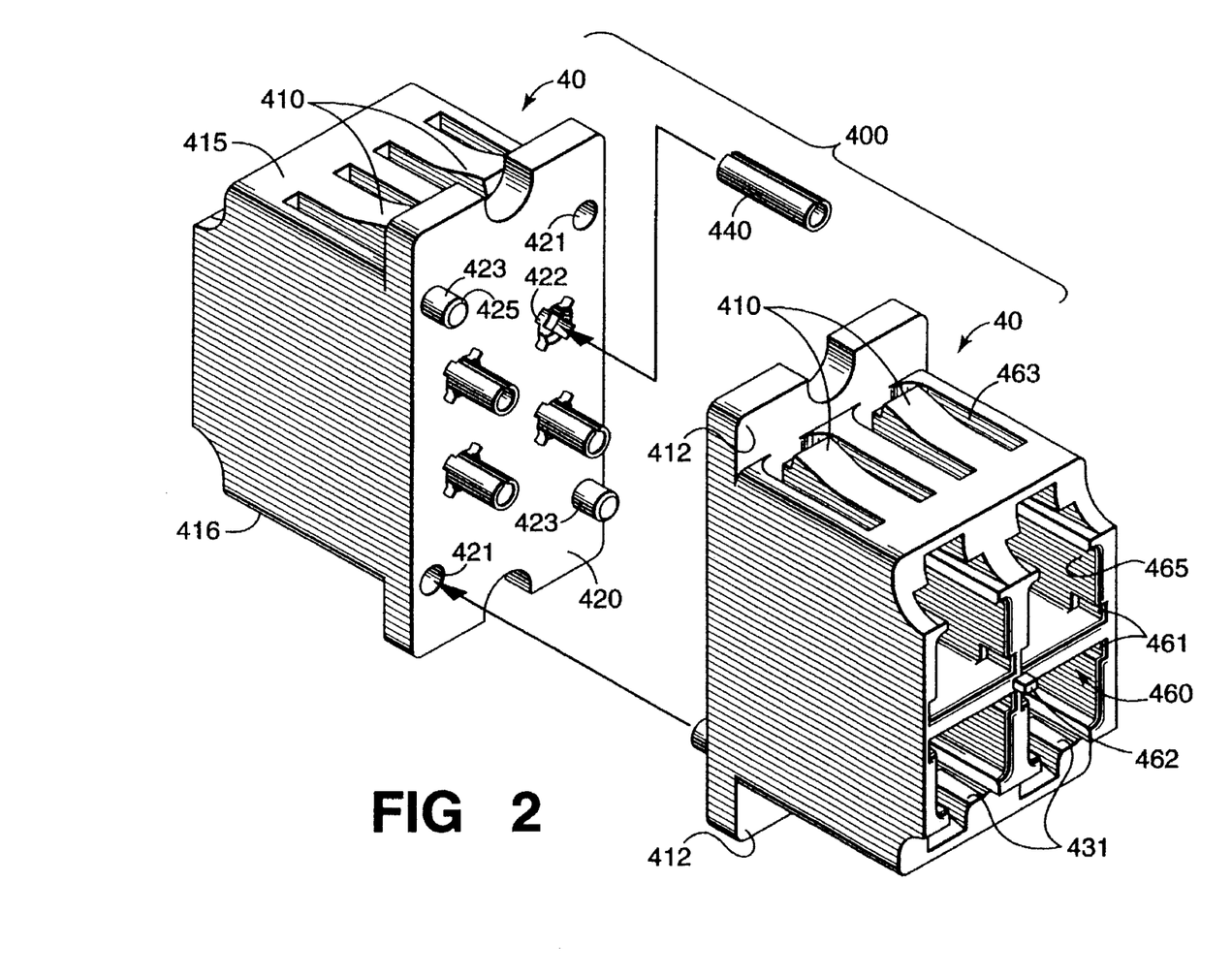
FIG. 2 is a perspective view of a pair of identical quadruplex jack receptacles, back to back, about to be assembled into an adapter.

FIG. 2 is a perspective view of a pair of identical quadruplex jack receptacles 40—40, back to back, about to be assembled into a single adapter 400. Receptacle 40 includes four identical cavities 460 that are compactly arrayed and adapted to receive a plurality of optical connectors of the type shown in FIG. 1. Each jack receptacle 40 has a generally planar back surface 420 which includes a pair of cylindrical pins 423 projecting outwardly, a pair of cylindrical holes 421 projecting inwardly, and four openings 422 for receiving an alignment sleeve 440. The pins 423 each have a slightly larger diameter than the holes 421. Illustratively, the pins and holes each have a nominal diameter of 1.5 mm; but to assure a substantially permanent connection between the pins and holes, an interference of about 0.04 mm is used (i.e., each pin has a diameter which exceeds the diameter of its corresponding hole by about 0.04 mm). Nevertheless, so that the pins can be readily inserted into slightly smaller holes, each pin includes a bevel or taper 425 on its distal end.

During assembly, the alignment sleeves 440 are inserted into the openings 422 in one of the receptacles. (It is noted that each of these four openings 422 comprises the bottom portion of a boss 424 (see FIG. 4) that extends into each of the four cavities 460 in the receptacle 40.) The pair of jack receptacles 40—40 are aligned so that the pins 423 in one receptacle are positioned to mate with the holes 421 in the other receptacle, and the alignment sleeves 440 in one receptacle are positioned to mate with the openings 422 in the other receptacle. These receptacles are then pressed together with sufficient force to cause their planar back surfaces 420—420 to touch each other. Because each pin 423 is slightly larger than its mating hole 421, the pair of receptacles can, advantageously, be press-fit together without adhesives or ultrasonic welding.

A vertically stacked duplex connector can be assembled by joining a pair of optical connectors together, one on top of the other. A clip is attached to one side of each connector to join them together. And because it is desirable to prevent the resulting duplex connector from being inserted into receptacle 40 in certain orientations, post 462 is molded into the front of receptacle 40 so that it will interfere with the clip if the duplex connector is inserted into the wrong cavities. In other words, post 462 is used to assure correct polarization.

The top surface 415 and bottom surface 416 of quadruplex jack receptacle 40 are identical and include a plurality of panel-locking members 410, 410. Illustratively, one panel-locking member 410 is associated with each cavity; and as will be discussed below, opening 463 between panel-locking member 410 and sidewall 465 advantageously enables a simple U-shaped molding insert to be used for molding a tab-retaining shoulder within the cavity 460. The panel-locking members 410, 410 comprise cantilevers whose free ends cooperate with flange 412, during insertion of receptacle 40 into an aperture in a flat panel, to capture and hold an edge of the panel therebetween.

Quadruplex receptacle 40 is preferably molded from a thermoplastic material, such as polycarbonate, and is designed for ease of molding. For example, panel-locking member 410 is a cantilever beam that is formed by molding a U-shaped opening 463 in the top surface 415 of the receptacle. This opening 463 provides direct access to a pair of tab-retaining shoulders, within the cavity of the receptacle, that are used for locking an optical connector into the receptacle. Accordingly, a simple molding insert can be used for creating the cantilever and the tab-retaining shoulder.

A number of quadruplex jack receptacles 40 can be mounted, side by side, in a first horizontal row within a panel having an elongated rectangular aperture. No space between adjacent receptacles is required. However, when mounting a second row of quadruplex receptacles above and/or below the first row, a small vertical distance between rows is required so that a user can manually access the trigger 130 or latch 120 on an inserted optical connector 10 (shown in FIG. 1).

Figure 3:
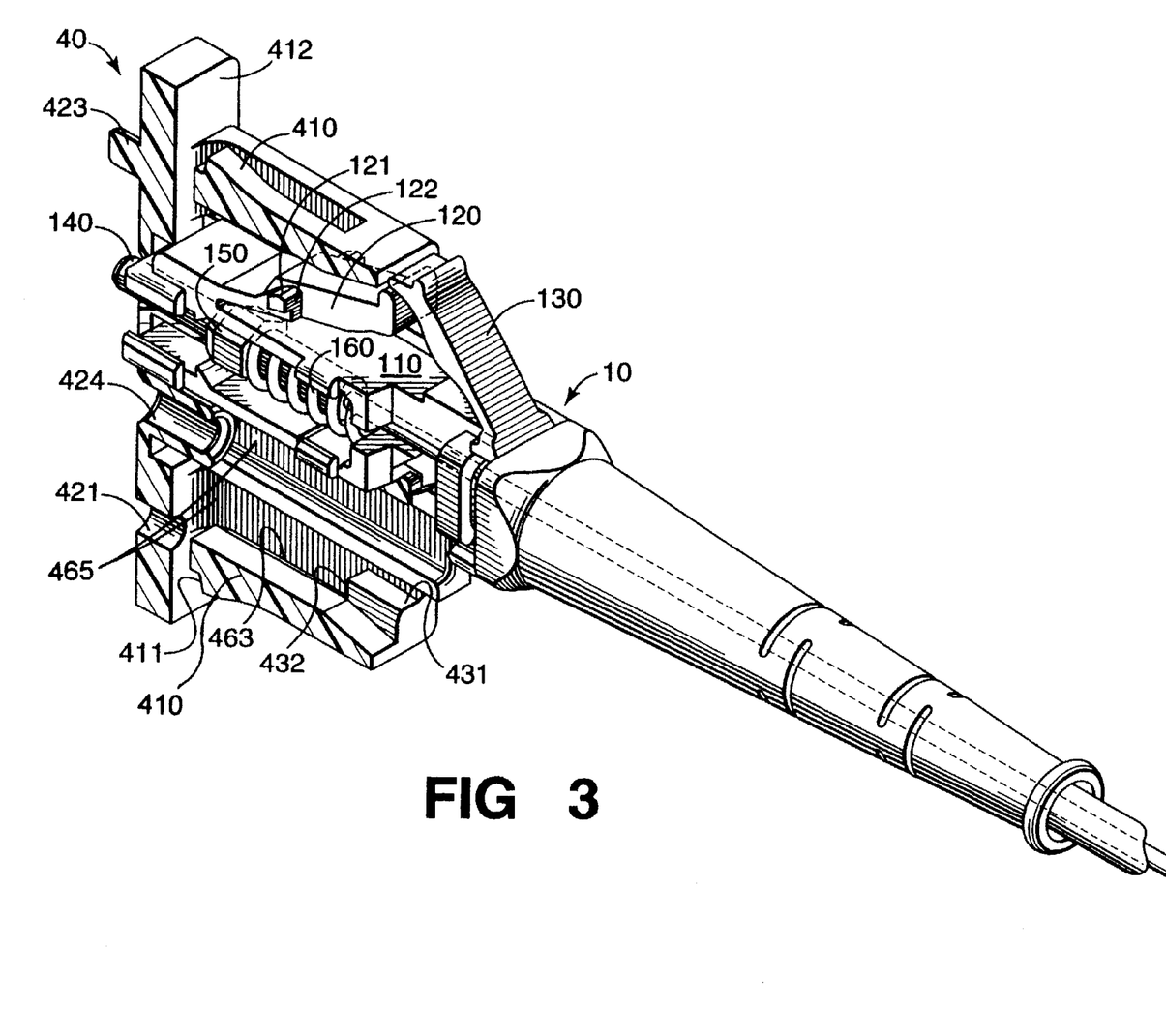
FIG. 3 is a perspective view of an optical fiber connector inserted within a quadruplex jack receptacle, which is shown in cross section. The connector is shown with its cover removed for clarity.

FIG. 3 is a perspective view of an optical fiber connector 10 inserted within the quadruplex jack receptacle 40. And although a quadruplex receptacle comprises four cavities for receiving optical connectors, only two cavities are shown in cross section. Moreover, only one connector is inserted in order to illustrate certain details within the cavity interior. The top and bottom cavities are mirror images of each other. Finally, connector 10 is shown with its cover 100 (see FIG. 1) removed for clarity. The compactness of receptacle 40 is noted along with its user convenience.

For example, in order to remove connector 10 from the receptacle, access to trigger 130 is required. The vertically stacked cavities in receptacle 40 are configured so that the trigger on one connector will be upward facing while the trigger on the other connector will be downward facing.

Housing 110 of the connector is generally U-shaped and supports a fiber-holding structure comprising ferrule 140, base member 150, and spring 160. The spring 160 surrounds the back cylindrical portion of base member 150 and urges the end face of ferrule 140 from right to left, as viewed in FIG. 3. Ferrule 140 may be a glass, metal, ceramic or plastic cylinder having a narrow passageway (about 126 µm in diameter) through its central axis for receiving an end portion of an optical fiber. Illustratively, the ferrule has an outer diameter of about 1.25 mm and a length of about 7.0 mm.

Receptacle 40 is secured to a panel 200 (see FIG. 1) via tapered surface 411 on its panel-locking members 410. These tapered surfaces cooperate with flange 412 to interlock the receptacle and the panel, in a snug manner, for panels having different thickness. Receptacle 40 is removed from the panel by squeezing the panel-locking members and pushing the receptacle forward. As discussed in connection with FIG. 2, two identical receptacles 40—40 are joined by joining their back surfaces 420 together end-to-end before insertion into the panel. Mating portions 421,423 are used to assure proper alignment. Nevertheless, so that the ferrules 140 within the connectors are perfectly aligned, alignment sleeves 440 (see FIG. 4) are installed in cylindrical bosses 424 before the receptacles are joined. Suitable alignment sleeves, made from metal, ceramic or even plastic material, are well known in the art and are not discussed further.

Within each cavity of receptacle 40 are a pair of symmetrically disposed tab-retaining shoulders, each formed by a horizontal surface 431 and a vertical surface 432. The horizontal surface 431 interacts with projection 121 on latching tab 120 to deflect it downward (i, e., toward the central axis of the connector). The vertical surface 432 interacts with vertical surface 122 on projection 121 to lock optical connector 10 into the receptacle 40.

Figure 4:
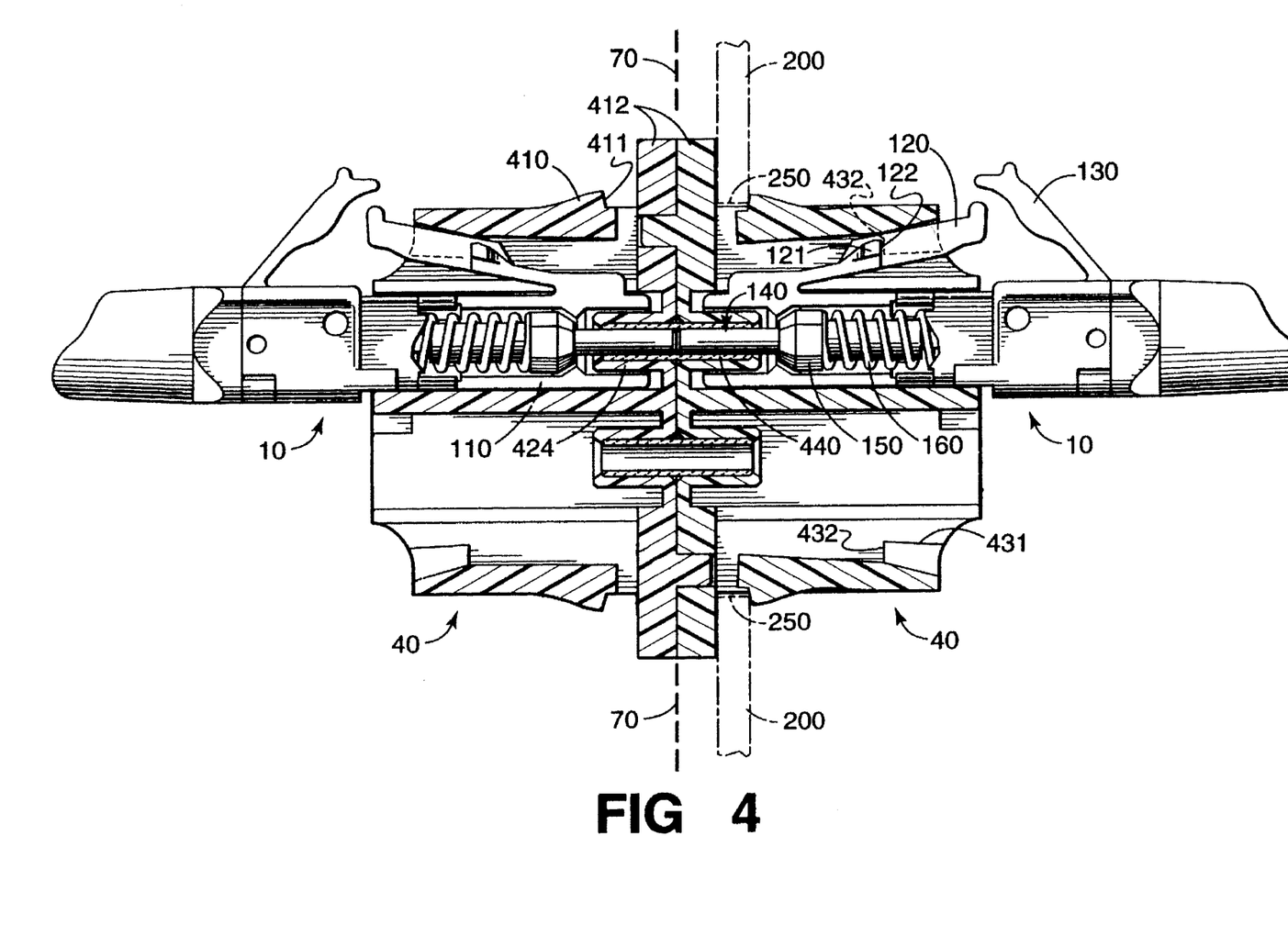
FIG. 4 shows a cross-section view of a pair of interconnected optical connectors and receptacles.

FIG. 4 discloses an almost-symmetrical interconnection between a pair of optical fibers meeting at optical plane 70—70. And while a connector-to-connector example is shown, it is clear that the connector can be joined to any optical device. Because this drawing is nearly symmetrical, what is said regarding the left-half portion applies to the right-half portion as well. An end portion of each optical fiber (whose coating has been removed) is held within an axial passageway of ferrule 140, and each ferrule is held within a mating cavity of base member 150. A compression spring 160 surrounds the base member and urges it, and its associated ferrule, toward the other base member and ferrule. A pair of ferrules are axially aligned via insertion into opposite ends of the same alignment sleeve 440. The alignment sleeve is supported within the cylindrical passageway formed by back-to-back bosses 424, 424 which are molded into the back end of each receptacle 40.

Connector 10 is considered a "floating" design in which the two ferrules are spring loaded and supported by alignment sleeve 440 within cylindrical boss 424 of the receptacle. When the first connector is inserted into the left-side receptacle, its associated ferrule 140 overtravels the optical plane 70—70 between the receptacles 40, 40. When the second connector is inserted into the right-side receptacle, and contact between the end faces of these two ferrules is made, the first ferrule is pushed backwards and the base: members 150, 150 are no longer in contact with the housing 110 interior. The first ferrule continues moving backward until equilibrium is reached between the spring loading of the two ferrules provided by the compression springs.

Figure 6:
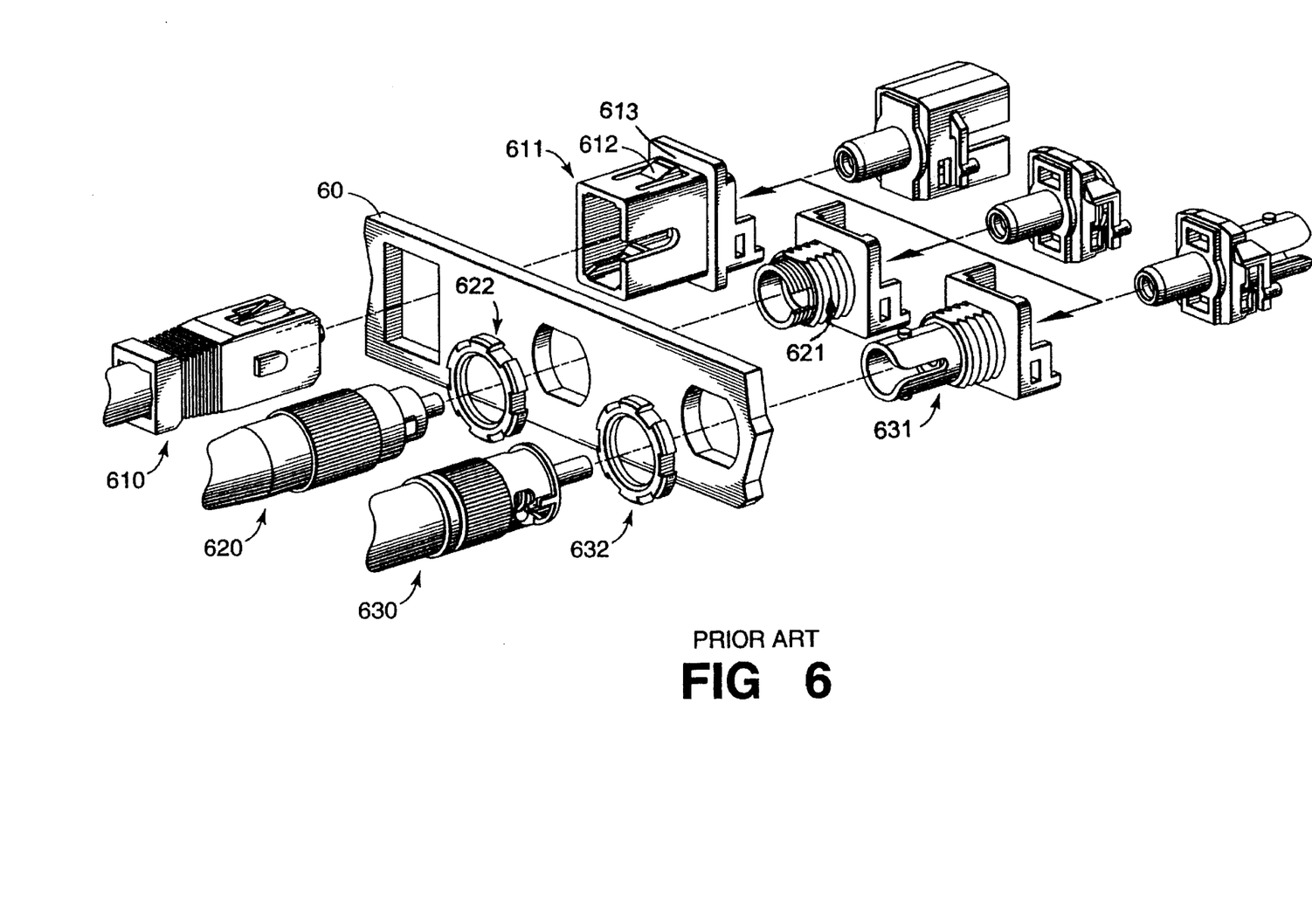
FIG. 6 shows three prior-art adapters and associated optical connectors.

Of interest in FIG. 4 is latching tab 120 which moves downward while being inserted into the receptacle 40, but then springs back (upwardly) after insertion is complete. The downward movement of the latch is caused by interference (during insertion) between projection 121 on the latch and horizontal surface 431 on the receptacle. Thereafter, vertical surface 432 on the receptacle interacts with vertical surface 122 on the projection 121 of latching tab 120 to lock the connector into the receptacle. Removal of the connector is readily accomplished by manually depressing latching tab 120 downward and pulling the connector outwardly. Trigger 130 advantageously extends the area which can be used for accessing the latching tab. And as mentioned above, when two connectors are inserted into the same receptacle 40, one above the other, their latches are positioned outwardly to improve user accessibility. The desire to pack a large number of optical fiber connectors into a small area has been an incentive to improve the various prior art receptacles shown in FIG. 6.

Of additional interest in FIG. 4 is the construction of panel-locking member 410 which cooperates with flange 412 to capture an edge of the panel 200 therebetween when receptacle 40 is installed in aperture 250 of the panel. In this illustrative embodiment of the invention, panel 200 comprises a generally planar structure having a nominal thickness of about 1.65 mm (0.065 inches). The free end of the panel-locking member 410 includes a smooth wall 411 that is tapered at an acute angle of about 14 degrees with respect to the plane of panel 200. (Alternatively viewed, the smooth wall intersects the panel-locking member at an obtuse angle of about 104 degrees.) Accordingly, the minimum and maximum distances between the tapered wall 411 and the flange 412 are about 1.5 mm and 1.8 mm respectively. During insertion of the receptacle 40 into the panel 200, panel-locking member 410 is deflected downward. However, the restorative force causes panel-locking member 410 to move upward after the panel edge is positioned between the member and the flange. But since the panel edge is thicker than the minimum distance, there will always be pressure on panel 200 from the tapered wall 411. Advantageously, the receptacle will not wobble within the aperture 250 because it is self-tightening. It is noted that some prior art designs use a stair-step arrangement in place of smooth tapered wall 411. Unfortunately, customers perceive such designs to be of low quality because a loose fit exists whenever the panel is too thick to fit on one stair step, but not thick enough to fully utilize the next larger step. (Variations in paint thickness on the panel are among the causes of this problem.) Other prior art designs incorporate the use of screws and nuts to attach the receptacle to the panel (see, for example, FIG. 6). These designs eliminate the problem of loose fit, but at the expense of additional parts and labor.

Figure 5:
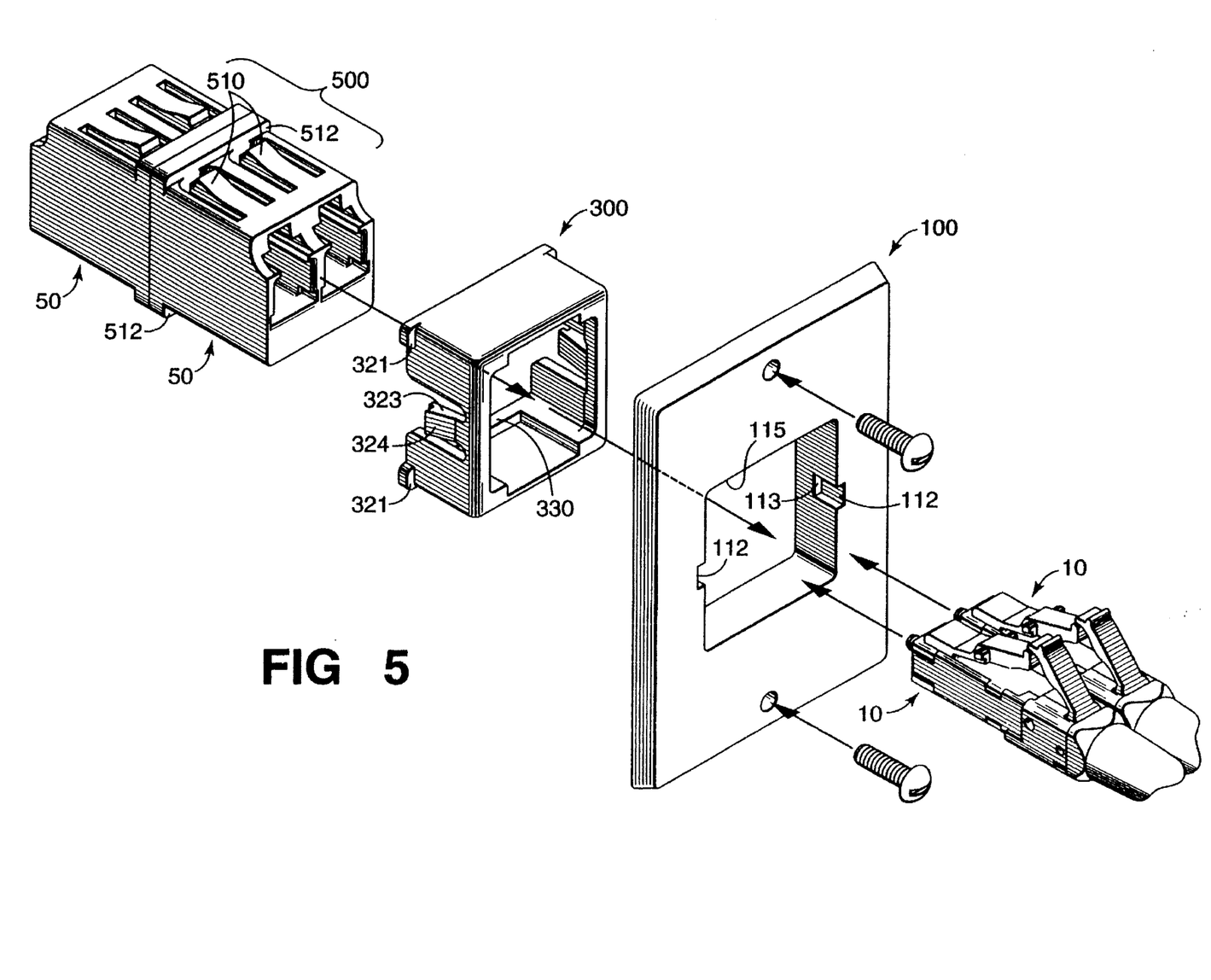
FIG. 5 is an exploded perspective view of a wall mounted assembly showing the interconnection among a duplex adapter, a carrier, a wall-plate, and a pair of optical connectors.

FIG. 5 is an exploded perspective view of a wall-mounted assembly showing the interconnection among a duplex adapter 500, a carrier 300, a wall plate 100, and a pair of optical connectors 10. A pair of duplex jack receptacles 50 are joined together, back to back, in the same manner as was disclosed in connection with the quadruplex jack receptacles 40 shown in FIG. 2. After being press-fit together, the duplex jack receptacles 50 are referred to as a duplex adapter 500, which functions to interconnect one pair of optical connectors 10 with another pair of optical connectors (not shown).

Duplex adapter 500 is then inserted into the back side of carrier 300 until flanges 512 preclude further advancement. Carrier 300 also includes flanges 330 (only one flange is shown) which interact with panel locking members 510 on jack receptacle 50 to keep it joined to the carrier. In this regard, the jack receptacle locks with flange 330 in the same way that it locks with panel 200 (see FIG. 4).

Wall plate 100 is a generally planar structure whose dimensions are approximately 7.0×11.4 mm (2¾×4 ½ inches). It is molded from a material such as Polyvinyl Chloride (PVC) and includes an aperture 115 for receiving carrier 300 which is inserted from the back side thereof. During installation, carrier 300 is pushed into aperture 115 until stop members 321 inhibit further advancement. Flexible member 323 includes a protrusion, such as wedge-shaped tab 324, for latching the carrier in place. The shape of aperture 115 in wall plate 100 corresponds to the shape of carrier 300, and is sized to interact with the wedge-shaped tab 324 so that the carrier will easily snap into the slots 112 and be retained therein by ledge 113. In this illustrative embodiment, ledge 113 is formed perpendicular to slot 112. Other details regarding wall plate 100 are disclosed in U.S. Pat. No. 5,096,439 which is hereby incorporated by reference Prior Art FIG. 6 discloses a number of known optical fiber connectors 610, 620 and 630 (each having 2.5 mm diameter ferrules) for insertion into receptacles 611,621 and 631 respectively. Greater detail regarding these known connectors is provided in U.S. Pat. No. 5,274,729 to King et al. Briefly, however, optical connector 610 is commonly referred to as an SC connector which fits into a jack receptacle (buildout block) 611. During assembly, the buildout block is pushed through a rectangular aperture in panel 60 where it is held in place by panel-locking member 612. This panel-locking member 612 includes a free-end portion that cooperates with flange 613 to capture panel 60 therebetween. Insertion and removal of SC-connector 610 generally requires that the user be able to fit his/her fingers onto its opposite sides—thereby making it difficult to extract one particular connector from an array that includes horizontally and vertically stacked connectors. The need to touch both sides of the connector reduces overall packing density. Moreover, receptacle 611 includes an internal latching member comprising a pair resilient catch pieces that expand into the cavity when the connector 610 is inserted. Accordingly, the disclosed receptacle 611 is larger than desired. Optical connectors 620 and 630 (FC-type and ST-type) also require that the user place his/her fingers onto both sides of the connector to fully rotate it during insertion and removal from their respective buildout blocks 621, 631. More importantly, these buildout blocks each require nuts 622, 632 for attachment to panel 60, and do not appear to be suitable for mass mounting in an array.

Although various particular embodiments of the present invention have been shown and described, modifications are possible within the spirit and scope of the invention. These modifications include, but are not limited to, a jack receptacle that mounts on a printed wiring board; and a jack receptacle having a different number of cavities than the number shown in the particular embodiments. Moreover, when two receptacles are assembled to form an adapter, these modifications include but are not limited to: the use of different shapes, positioning and quantity of pins/holes; the use of bonding techniques other than pins/holes to assemble the receptacles; and an adapter wherein one jack receptacle accommodates one type of optical connector while the other jack receptacle accommodates another type of optical connector.

We claim:

1. A one-piece, molded jack receptacle including front and back ends, top- and bottom-side surfaces, and a pair of cavities; each cavity having (i) a rectangular opening into the front end of the receptacle, (ii) a circular opening into the back end of the receptacle, and (iii) a U-shaped opening into the top-side surface, said U-shaped opening forming a cantilever whose free-end portion deflects into the cavity; each cavity further having a non-movable retaining surface for holding an optical connector within the cavity, said retaining surface being located directly beneath the U-shaped opening.

2. The jack receptacle of claim 1 wherein said receptacle is molded from thermoplastic material.

3. The jack receptacle of claim 3 wherein the thermoplastic material comprises polycarbonate.

4. The jack receptacle of claim 1 wherein each cavity further includes a boss which projects into it from the back end of the receptacle, each boss having a cylindrical passageway for receiving the alignment sleeve, and each cylindrical passageway communicating with one of the circular openings in the back end.

5. The jack receptacle of claim 1 wherein the back end comprises a generally planar exterior surface which includes a pair of outwardly projecting pins and a pair inwardly projecting holes, said pins and holes having complementary mating shapes that are positioned to interlock with an identical jack receptacle when they are aligned back-to-back.

6. The jack receptacle of claim 5 wherein the pins and holes are cylindrically shaped, said pins having slightly larger diameters than the holes, said pins being tapered at their distal ends.

7. An adapter for optical connectors comprising a pair of jack receptacles that are joined together back to back, each jack receptacle being a unipartite structure comprising front and back ends, a pair of outside surfaces, and a row of cavities, each cavity having an opening into the front end of the receptacle for receiving an optical connector, each cavity having a boss which projects into it from the back end of the receptacle, each boss including a cylindrical passageway which opens into the back end of the receptacle, each cavity having a rigid retaining surface for interlocking with a movable latching member on the optical connector, and each cavity having a U-shaped opening into one of the outside surfaces that forms a cantilever whose free end portion is positioned toward the back end of the receptacle;

the back end of each receptacle having a generally planar exterior surface which includes a plurality of pins and holes for aligning the cylindrical passageways when the receptacles are joined together back-to-back; and a plurality of alignment sleeves that extend between the pair of receptacles and into the cylindrical passageways.

8. The adapter of claim 7 wherein the receptacles are joined together by press-fitting to form the adapter, said pins and holes being cylindrically shaped, and said pins having slightly larger diameters than the holes.

9. A method for assembling a pair of substantially similar jack receptacles to form an adapter, each jack receptacle having a generally planar back surface which includes a cylindrical pin projecting outwardly, a cylindrical hole projecting inwardly, and an opening for receiving an alignment sleeve; said pin having a slightly larger diameter than the hole and a tapered distal end, the method comprising the steps of:

inserting the alignment sleeve into the opening in one of the receptacles;

orienting the pair of jack receptacles, back to back, so that the pin and the alignment sleeve in one of the receptacles are respectively positioned to mate with the hole and the opening in the other of the receptacles; and pressing the receptacles together with sufficient force to cause their planar back surfaces to touch each other.

* * * * *